(12) United States Patent
Sieber

(10) Patent No.: US 10,865,704 B2
(45) Date of Patent: Dec. 15, 2020

(54) METHOD FOR OPERATING AN ELECTRIC MEDIA-FLOW MACHINE, CONTROL UNIT, MEDIA-FLOW MACHINE, COMPRESSOR AND/OR TURBINE

(71) Applicant: Robert Bosch GmbH, Stuttgart (DE)

(72) Inventor: Udo Sieber, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/439,356

(22) Filed: Jun. 12, 2019

(65) Prior Publication Data
US 2019/0383210 A1    Dec. 19, 2019

(30) Foreign Application Priority Data

Jun. 15, 2018   (DE) .................. 10 2018 209 708

(51) Int. Cl.
| | |
|---|---|
| *F02B 37/14* | (2006.01) |
| *F02B 37/10* | (2006.01) |
| *F02B 39/10* | (2006.01) |
| *H02K 21/20* | (2006.01) |
| *F02C 6/12* | (2006.01) |

(52) U.S. Cl.
CPC .............. *F02B 37/14* (2013.01); *F02B 37/10* (2013.01); *F02B 39/10* (2013.01); *F02C 6/12* (2013.01); *H02K 21/20* (2013.01); *F05D 2210/12* (2013.01); *F05D 2220/40* (2013.01)

(58) Field of Classification Search
CPC .......... F02B 33/40; F02B 37/10; F02B 37/14; F02B 39/10; F02C 6/12; H02K 21/20; F05D 2210/12; F05D 2220/40; Y02T 10/144
See application file for complete search history.

(56) References Cited

U.S. PATENT DOCUMENTS

| | | | | |
|---|---|---|---|---|
| 3,806,785 A | * | 4/1974 | DeValroger | ............ H02K 29/12 |
| | | | | 318/400.2 |
| 2009/0174267 A1 | * | 7/2009 | Bischof | ............... F04D 25/0606 |
| | | | | 310/52 |

FOREIGN PATENT DOCUMENTS

| | | |
|---|---|---|
| DE | 102014210451 A1 | 12/2015 |
| DE | 102017207532 A1 | 11/2018 |

* cited by examiner

*Primary Examiner* — Jesse S Bogue
*Assistant Examiner* — Loren C Edwards
(74) *Attorney, Agent, or Firm* — Norton Rose Fulbright US LLP; Gerard Messina

(57) ABSTRACT

A method is described for operating an electric media-flow machine for a compressor and/or a turbine, especially for an exhaust-gas turbocharger of an internal combustion engine, having a shaft rotationally mounted in a housing that has an inlet and an outlet for a medium to be conveyed, a rotor being disposed in rotatably fixed manner on the shaft, having a stator that is fixed in the housing and has at least one polyphase drive winding as well as a plurality of stator teeth projecting radially to the inside, having a covering cap that covers the rotor upstream and to which an inner sleeve is joined surrounding the rotor circumferentially. An outer sleeve is disposed coaxially relative to the inner sleeve, the inner sleeve and the outer sleeve being fixed in the housing, and the stator teeth extending through the outer sleeve at least up to the inner sleeve.

14 Claims, 4 Drawing Sheets

METHOD FOR OPERATING AN ELECTRIC MEDIA-FLOW MACHINE, CONTROL UNIT, MEDIA-FLOW MACHINE, COMPRESSOR AND/OR TURBINE

FIELD OF THE INVENTION

The present invention relates to a method for operating an electric media-flow machine for a compressor and/or a turbine, especially for an exhaust-gas turbocharger of an internal combustion engine, having a shaft rotationally mounted in a housing that has an inlet and an outlet for a medium to be conveyed, a rotor being disposed in rotatably fixed manner on the shaft, having a stator that is fixed in the housing and has at least one polyphase drive winding as well as a plurality of stator teeth projecting radially to the inside, the media-flow machine being traversed at least in sections by the medium to be conveyed, and having a covering cap that covers the rotor upstream and to which an inner sleeve is joined surrounding the rotor circumferentially, and having an outer sleeve that is disposed coaxially relative to the inner sleeve, the stator teeth extending through the outer sleeve at least up to the inner sleeve, and flow channels being formed between the outer sleeve, the inner sleeve and the stator teeth as the only flow paths for the medium flowing from the inlet to the outlet through the media-flow machine.

In addition, the invention relates to a control unit for operating such a media-flow machine, a media-flow machine having the control unit as well as a compressor and/or a turbine, especially an exhaust-gas turbocharger for an internal combustion engine, having such a media-flow machine.

BACKGROUND INFORMATION

Methods, control units, electric machines and compressors and/or turbines of the type indicated at the outset are already known from the related art.

Media-flow machines and turbochargers of the type indicated above are already known from the related art. Thus, for example, the German Published Patent Application No. 10 2014 210 451 describes a turbocharger having an integrated electric media-flow machine. Turbochargers, particularly exhaust-gas turbochargers, are used especially in manufacturing motor vehicles to increase the air charge in cylinders of an internal combustion engine in order to improve the performance of the internal combustion engine. To that end, exhaust-gas turbochargers are often used, which are driven by the stream of exhaust gas from the internal combustion engine. Moreover, it is known to back up a turbocharger electromotively, so that drawn-in fresh air may be compressed independently of an exhaust-gas stream of the internal combustion engine and supplied to the combustion engine with increased charge air pressure. A combination of both variants is also already known. In that case, an exhaust-gas turbocharger is provided with an electric machine in order to drive the shaft of the exhaust-gas turbocharger, on which a compressor impeller as well as a turbine wheel are disposed in rotatably fixed fashion. As a result, for example, the otherwise delayed buildup of charge air pressure may be accelerated significantly.

The realization of the electromotive backup by a media-flow machine has the advantage that the motorized support may be integrated into the turbocharger in especially space-saving manner, because the fresh air drawn in is guided through a media gap formed between the rotor and stator of the media-flow machine. Thus, the media-flow machine is able to be integrated into the flow path in space-saving fashion. In addition, this yields the advantage that the rotor and stator of the media-flow machine are cooled by the stream of air.

The stator usually has a ring-shaped stator yoke as well as stator teeth that project radially inwardly from the stator yoke and are set apart uniformly from each other as viewed in the circumferential direction. A polyphase drive winding is usually wrapped around the stator teeth, the energizing of the phases of the drive winding with the aid of power electronics provided for that purpose generating the rotating driving magnetic field, by which the rotationally mounted rotor is driven by the shaft with a predefineable turning moment.

At the same time, the rotor expediently has at least one permanent magnet which interacts with the rotating magnetic field.

In addition, from the not yet published patent application German Published Patent Application No. 10 2017 207 532, it is known to provide a device which is fixed in the housing and is used to optimize flow, and by way of an outer sleeve and an inner sleeve, defines flow channels through the stator.

SUMMARY

The method according to the present invention has the advantage that deposits of, in particular, ferromagnetic particles on the rotor or on the inner sleeve are avoided in an easy manner. In so doing, no retrofitting work is necessary on the media-flow machine, so that the integration of the advantageous method may be accomplished solely in the control unit, and consequently is achievable easily and cost-effectively by a corresponding programming. As a result, the method may also be introduced later in an inexpensive and uncomplicated manner into already existing media-flow machines by a software upgrade, for instance. The invention provides that the drive winding of the stator is driven at least intermittently in such a way that it generates an opposing field rectified relative to a magnetic field of the rotor. Due to the rectified opposing field, the holding force of deposited ferromagnetic particles is canceled at least locally, whereby particles already deposited on the rotor detach from it, and particles in the stream of air are not even attracted to the rotor, especially to the inner sleeve and the covering cap. The development of deposits is thereby prevented, and existing deposits are able to be detached.

According to one preferred further development of the invention, the opposing field is generated as a function of the angular position of the rotor. This ensures that the opposing field is constantly directed counter to the rotor magnetic field and possibly co-rotates with the rotor in order to permit a longer phase with canceled holding force.

Optionally, the rotor position is determined by an induction-based process or by a current-induction process. In so doing, for example, use is made of the reactive generator voltage, induced by the rotor in the stator, which is able to be measured in non-energized phases.

Preferably, the rectified opposing field is generated with a constant strength.

Alternatively, the rectified opposing field is generated preferably with a pulsating strength. Due to the pulsating strength, thus, due to a swelling and shrinking of the opposing field as a function of time, particles already deposited are able to be detached, especially knocked off of the inner sleeve and the covering cap more easily by the changing magnetic forces.

According to one preferred further development of the invention, the rectified opposing field is generated equiangularly relative to the rotor magnetic field. Because of this exact alignment of the opposing field with the north-south direction of the rotor magnetic field, no additional torque is generated at the rotor, and therefore the ongoing operation of the media-flow machine is not influenced.

According to an alternative specific embodiment of the invention, the rectified opposing field is generated in a manner deviating by a predefineable angle, especially deviating by up to 90°, from the rotor magnetic field. As a result, a narrow magnetic neutral strip develops on the inner sleeve. The particles deposited there lose their holding force and are entrained by the stream of air. As the rotor rotates, the neutral strip migrates synchronously with it, and after a complete revolution of the rotor, the deposited particles are removed or detached uniformly. The optionally pulsating opposing field acts supportively here, as well.

Especially preferred, the strength of the opposing field is varied with the strength of the media flow. Thus, in particular, it is provided that as the stream of air increases, the strength of the opposing field is reduced without thereby increasing the tendency for deposits to form. In this manner, energy is saved, and in fact, the performance of the electric machine is maximized.

The control unit according to the present invention for operating the electric machine is characterized in that it is adapted especially to carry out the method of the present invention. The advantages already cited are thereby obtained.

The electric machine according to the present invention is characterized by the control unit of the present invention. The advantages already cited are obtained.

The compressor according to the invention and/or the turbine according to the invention, particularly the exhaust-gas turbocharger of the internal combustion engine of a motor vehicle is/are characterized in that the electric media-flow machine is formed according to the present invention. The advantages already cited are obtained.

DETAILED DESCRIPTION

Figure 1:
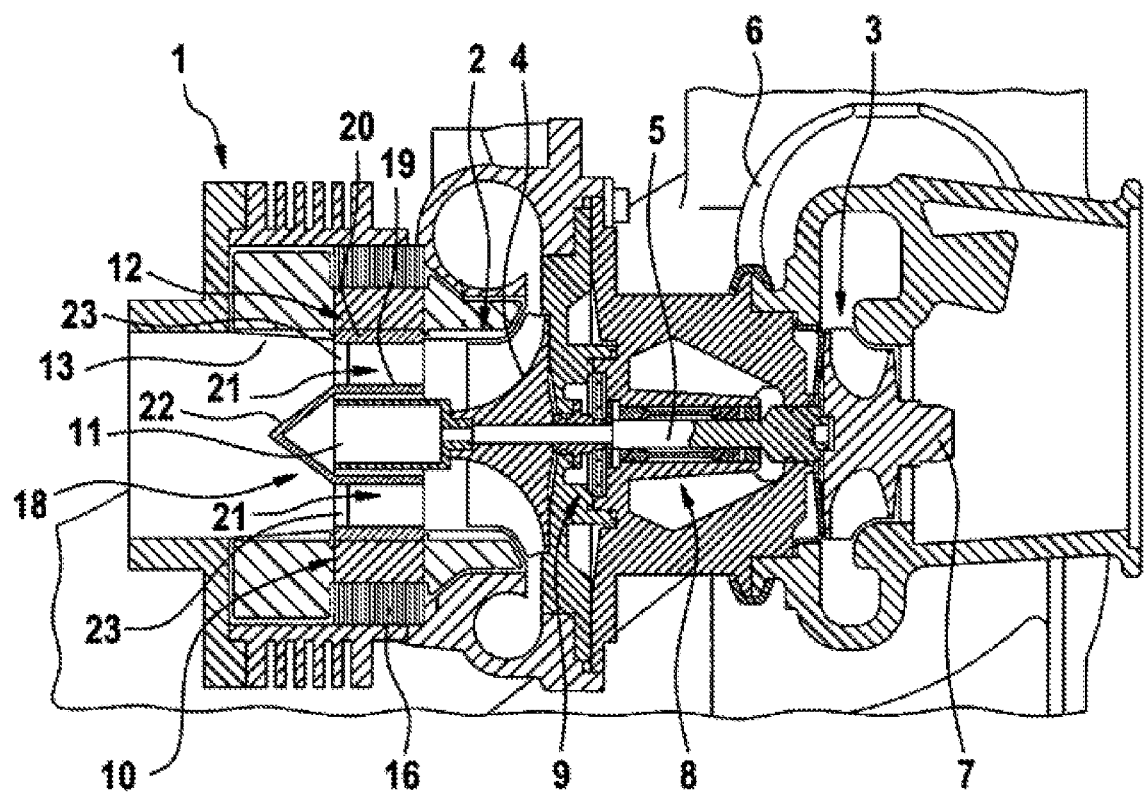
FIG. 1 shows a simplified longitudinal sectional representation of an advantageous exhaust-gas turbocharger of an internal combustion engine.

FIG. 1 shows a simplified longitudinal sectional representation of an exhaust-gas turbocharger 1, which has a compressor 2 as well as a turbine 3. Compressor 2 has a compressor impeller 4, which is disposed in rotatably fixed manner on a shaft 5. Shaft 5 itself is rotationally mounted in a housing 6 of exhaust-gas turbocharger 1. In addition, at an end of shaft 5 facing away from compressor impeller 4, a turbine wheel 7 of turbine 3 is joined in rotatably fixed manner to shaft 5. When exhaust gas from an internal combustion engine impinges on turbine wheel 7 and thereby drives it, compressor impeller 4 is likewise set into rotational movement, so that fresh air conveyed to compressor impeller 4 is compressed and supplied to the internal combustion engine.

The rotatable mounting of shaft 5 in housing 6 may be realized in various ways. According to a first exemplary embodiment, shaft 5 is rotationally supported in housing 6 by at least two bearings 8 and 9. Preferably, two rolling-element bearings are provided as bearings 8, 9. For the axial support of shaft 5, one of the rolling-element bearings may also take the form of an axial rolling-element bearing.

Alternatively and according to the exemplary embodiment shown in FIG. 1, bearing 8 takes the form of a magnetic bearing, and bearing 9, which is used as axial bearing, takes the form of a rolling-element bearing.

In order that, in particular, compressor 2 is able to be driven independently of the stream of exhaust-gas from the internal combustion engine, so that a high air charge is able to be reached in the cylinders of the internal combustion engine at any time, in the present case, it is additionally provided that exhaust-gas turbocharger 1 has an electric media-flow machine 10. In the present case, it is integrated into compressor 2, a rotor 11 of media-flow machine 10 being disposed in rotatably fixed manner on the end of shaft 5 facing away from turbine wheel 7. A stator 12, interacting with rotor 11, is disposed coaxially relative to rotor 11 and fixed in the housing, in flow channel 13 of exhaust-gas turbocharger 1 leading to compressor impeller 4.

Figure 2:
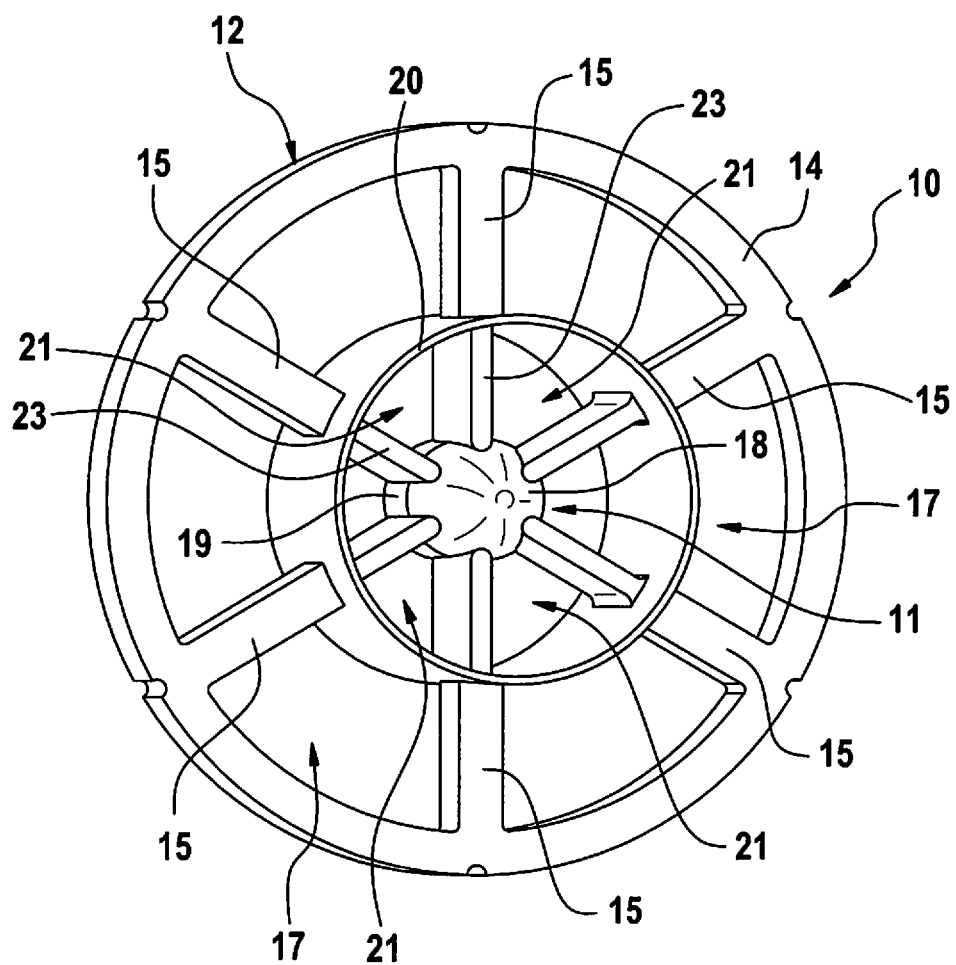
FIG. 2 shows a perspective representation of a media-flow machine of the turbocharger.

FIG. 2 shows a simplified perspective representation of media-flow machine 10. Stator 12 has a ring-shaped stator yoke 14, from which a plurality of stator teeth 15, distributed uniformly over the periphery of stator yoke 14, project radially to the inside and point in the direction of rotor 11. Stator teeth 15 end radially set apart from rotor 11, so that in each case an axial air gap 16 remains between stator teeth 15 and rotor 11.

Stator 12 is provided especially with a polyphase drive winding 17, as also shown in FIG. 1, for example. Drive winding 17 may be formed as a winding wound over the stator or a winding, especially made up of a plurality of coils, slipped radially onto stator teeth 15, at least one coil being pushed onto each stator tooth, as described, for example, in the not yet published patent application DE 10 2017 207 532.

Media-flow machine 10 also has a device 18 which is designed to optimize the flow behavior of the medium conveyed by exhaust-gas turbocharger 1, thus, especially the fresh air, through media-flow machine 10. To that end, device 18 has an inner sleeve 19, assigned to rotor 11, whose inside diameter is larger than rotor 11, so that rotor 11 is accommodated in inner sleeve 19 as shown, for example, in FIG. 2, and lies in it without contact, permitting rotor 11 to rotate without wear within inner sleeve 19. Inner sleeve 19 is secured to stator 12, so that inner sleeve 19 is fixed in the housing.

In addition, device 18 has an outer sleeve 20 which is disposed coaxially relative to rotor 11 or the axis of rotation of shaft 5, and has an inside diameter which is larger than the outside diameter of inner sleeve 19, so that outer sleeve 20 is secured to stator 12, particularly to stator teeth 15, in a manner that it is set apart radially outwardly relative to inner sleeve 19.

Outer sleeve 20 has an outside diameter which is smaller than the inside diameter of stator yoke 14, so that between outer sleeve 20 and stator yoke 14, free spaces exist between adjacent stator teeth 15, in which stator winding 17 is disposed or formed. Drive winding 17 is protected from the medium by outer sleeve 20, but nevertheless is cooled via the sleeve.

Stator teeth 15 extend through outer sleeve 20 up to inner sleeve 19, so that between inner sleeve 19, stator teeth 15 and outer sleeve 20, a plurality of flow channels 21 are formed, through which the medium flows through media-flow machine 10. Specifically, flow channels 21 form the only flow paths through which the medium is able to penetrate media-flow machine 10. To that end, preferably a covering cap 22 is assigned upstream to rotor 11 which covers rotor 11 upstream and, in particular, is designed to optimize flow in order to steer the medium into flow channels 21.

In contrast to conventional media-gap machines, the media path therefore does not lie radially between stator tooth and rotor, but rather is provided through flow channels 21 in stator 12 itself, so that the medium flows completely through stator 12. This provides an especially advantageous stator cooling, and the deposit of magnetic and/or magnetizable particles on the rotor is prevented or at least substantially avoided.

According to the present exemplary embodiment, inner sleeve 19 and outer sleeve 20 are cylindrical, so that as a whole they extend coaxially and in the direction of flow parallel to the axis of rotation of shaft 5 or of rotor 11, as evident particularly in FIG. 1.

Covering cap 22 has a conical or ovoid longitudinal section, and merges at its outer periphery, especially in one piece, into the inner sleeve. In addition, covering cap 22 and/or inner sleeve 19 has/have retaining struts 23 which extend radially to the outside and in each case are assigned to one of stator teeth 15 in such a way that they cover stator tooth 15 upstream in the area of flow channels 21. Moreover, retaining struts 23 are joined to outer sleeve 20, in particular are formed in one piece with it, and therefore ensure the cohesion of covering cap 22, inner sleeve 19 and outer sleeve 20.

Figure 3:
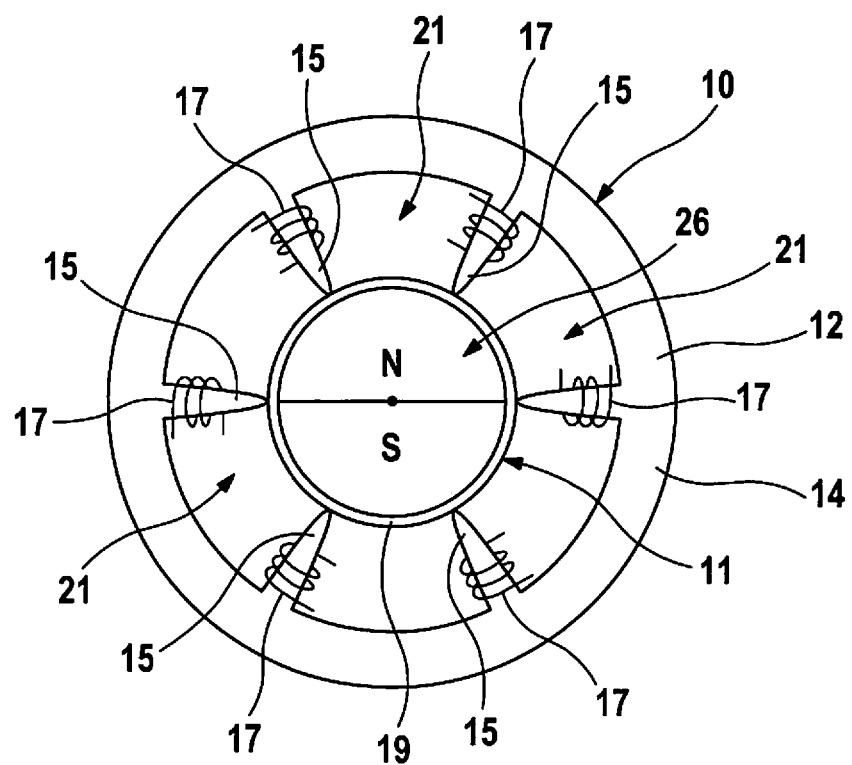
FIG. 3 shows a simplified cross-sectional representation of the media-flow machine.

FIG. 3 shows a simplified cross-sectional representation of media-flow machine 10, in which according to the present exemplary embodiment, rotor 11 has a permanent magnet 26 that defines a magnetic north pole N and south pole S.

During operation of exhaust-gas turbocharger 1, rotor 11 lies in the flow of intake air upstream of the compressor, so that the total intake air, which is supplied to a downstream internal combustion engine, sweeps past rotor 11 and especially magnet 26. Even if, as shown in FIG. 3, permanent magnet 26 is surrounded by inner sleeve 19 and, optionally, a separate rotor sleeve of rotor 11, with time, ferromagnetic particles settle on the outer side of inner sleeve 19. Owing to inner sleeve 19, deposits are avoided on rotor 11 itself, so that no imbalances develop at rotor 11. However, the deposits negatively influence the flow of air through flow channels 21 due to additional turbulence development, flow resistances or changes in the direction of flow. Ultimately, the efficiency and/or the maximum rate of air flow is thus reduced.

Using the method described in the following, deposits are avoided or existing deposits in flow channels 21 are released.

Figure 4:
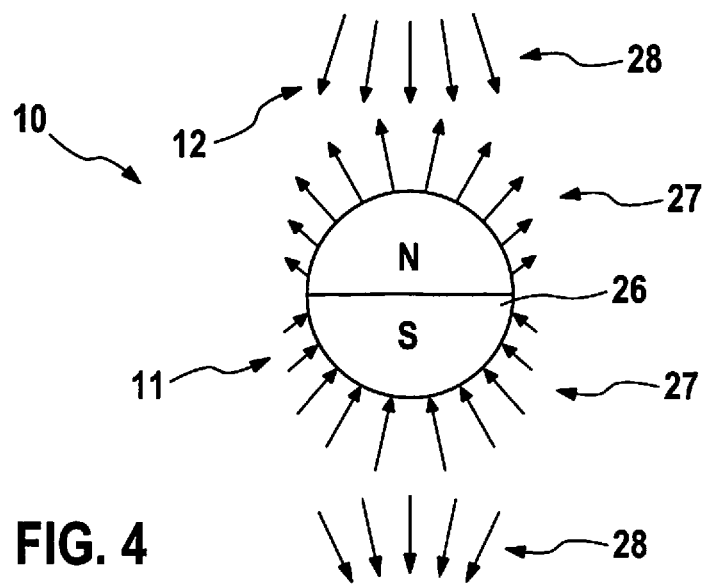
FIG. 4 shows a first exemplary embodiment for operating the media-flow machine.

To that end, FIG. 4 shows a simplified representation of media-flow machine 10 which here, for the sake of simplicity, shows only permanent magnet 26 and rotor magnetic field 27 generated by permanent magnet 26 and indicated by arrows, as well as a counter magnetic field generated by drive winding 17, set apart from permanent magnet 26 and indicated by arrows.

First of all, the rotor position, that is, the angular position of rotor 11, and therefore of permanent magnet 26, is monitored continuously during operation, either a separately provided position sensor being present for that purpose, or preferably, the rotor position or angular position being determined based on induction or by current-injection processes. On the basis of the known rotor position, through suitable energizing of drive winding 17 by a control unit, not shown in greater detail here, an opposing field rectified relative to the rotor magnetic field is generated. This is shown in FIG. 4 by the arrows of the magnetic fields pointing toward or away from each other. Due to the rectified opposing field of the stator, the holding force of the ferromagnetic particles deposited on rotor 11 is canceled, or the particles in the stream of air are not attracted to inner sleeve 19 in the first place. Preferably, the strength of the opposing field is selected to be constant. Alternatively, the strength of the rectified opposing field is pulsed, so that the rectified opposing field swells and shrinks as a function of time, whereby particles possibly already deposited on the inner sleeve are knocked off by changing magnetic forces. Due to the exact alignment of the rectified opposing field with the north-south direction of permanent magnet 26, provided in the exemplary embodiment of FIG. 4, no additional torque is generated at rotor 11, which means the operation of media-flow machine 10 is no longer influenced.

Figure 5:
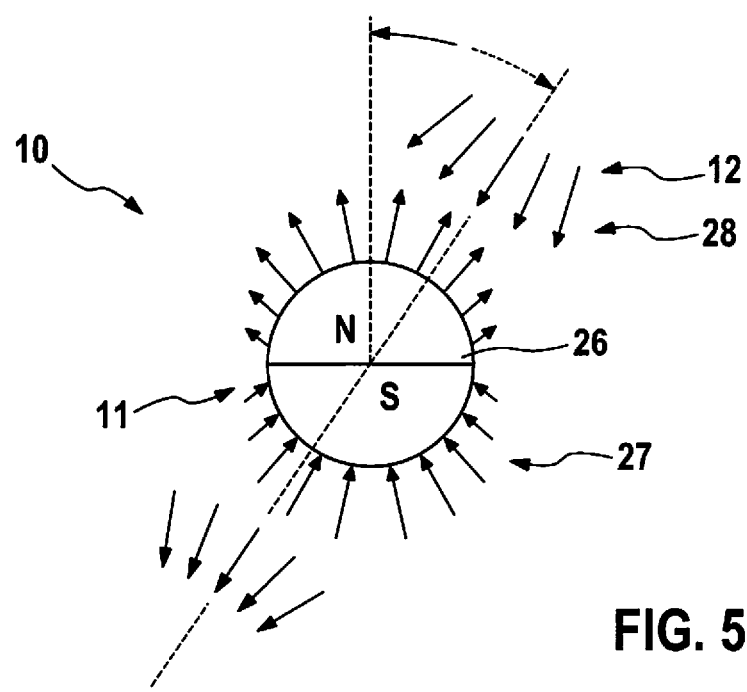
FIG. 5 shows a second exemplary embodiment for operating the media-flow machine.

FIG. 5 shows a further exemplary embodiment, which differs from the previous exemplary embodiment in that rectified opposing field 28 is rotated by a predetermined angle between 0 and 90° relative to the north-south direction of permanent magnet 26. In this way, a narrow magnetic neutral strip develops on the rotor sleeve or inner sleeve 19, in which the particles deposited there lose their holding force and are entrained with the stream of air. As rotor 11 rotates, this neutral zone migrates synchronously with it, and after a complete revolution of the rotor, the deposited particles are uniformly removed. The control unit therefore controls drive winding 17 in such a way that the rectified opposing field co-rotates with permanent magnet 26 during normal operation. A pulsating opposing field for loosening particles already deposited is advantageous in this exemplary embodiment, as well.

The strength of the opposing field is varied advantageously by the driving of drive winding 17, particularly a plurality of individual coils of drive winding 17, as a function of the strength of the air stream or the volume of air flow. Namely, as the volume of air flow increases, the opposing field is reduced without the tendency for deposits to form being increased at the same time. The effect of the reduced opposing field is offset by an increased volume of air flow which carries along the particles and prevents adhesion to inner sleeve 19.

While the present exemplary embodiment is specific to an exhaust-gas turbocharger 1, according to a further exemplary embodiment, the method described above is carried out in the case of a turbocharger operated only electromotively. However, further applications of the method for operating media-flow machine 10 are also conceivable that involve, e.g., electric pumps having, in particular, brushless drives and rotors around which the pump medium flows.

What is claimed is:

1. A method for operating an electric media-flow machine for at least one of a compressor and a turbine comprising a shaft rotationally mounted in a housing having an inlet and an outlet for a medium to be conveyed, a rotor being disposed in rotatably fixed manner on the shaft, the electric media-flow machine including a stator that is fixed in the housing and has at least one polyphase drive winding as well as a plurality of stator teeth projecting radially to an inside, the electric media-flow machine including a covering cap that covers the rotor upstream and to which an inner sleeve is joined surrounding the rotor circumferentially, and the electric media-flow machine including an outer sleeve that is disposed coaxially relative to the inner sleeve, the inner sleeve and the outer sleeve being fixed in the housing, the stator teeth extending through the outer sleeve at least up to the inner sleeve, and flow channels being formed between the outer sleeve, the inner sleeve, and the stator teeth as an only flow path for the medium flowing from the inlet to the outlet through the media-flow machine, the method comprising:

driving the drive winding at least intermittently such that a drive winding generates an opposing field rectified relative to a rotor magnetic field of the rotor, wherein a holding force of deposited ferromagnetic particles on the rotor is canceled such that the deposited ferromagnetic particles detach from the rotor.

2. The method as recited in claim 1, wherein the electric media-flow machine is for an exhaust-gas turbocharger of an internal combustion engine.

3. The method as recited in claim 1, further comprising generating the opposing field as a function of an angular position of the rotor.

4. The method as recited in claim 3, further comprising determining the angular position by one of an induction-based process and a current-injection process.

5. The method as recited in claim 1, further comprising generating the opposing field with a constant strength.

6. The method as recited in claim 1, further comprising generating the opposing field with a pulsating strength.

7. The method as recited in claim 1, further comprising generating the opposing field equiangularly relative to the rotor magnetic field.

8. The method as recited in claim 1, further comprising generating the opposing field in a manner deviating by a predefineable angle from the rotor magnetic field.

9. The method as recited in claim 8, wherein the predefineable angle is up to 90°.

10. A control unit for operating an electric media-flow machine for at least one of a compressor and a turbine comprising a shaft rotationally mounted in a housing having an inlet and an outlet for a medium to be conveyed, a rotor being disposed in rotatably fixed manner on the shaft, the electric media-flow machine including a stator that is fixed in the housing and has at least one polyphase drive winding as well as a plurality of stator teeth projecting radially to an inside, the electric media-flow machine including a covering cap that covers the rotor upstream and to which an inner sleeve is joined surrounding the rotor circumferentially, and the electric media-flow machine including an outer sleeve that is disposed coaxially relative to the inner sleeve, the inner sleeve and the outer sleeve being fixed in the housing, the stator teeth extending through the outer sleeve at least up to the inner sleeve, and flow channels being formed between the outer sleeve, the inner sleeve, and the stator teeth as an only flow path for the medium flowing from the inlet to the outlet through the media-flow machine, wherein the control unit carries out a method for operating the electric media-flow machine, the method comprising:

driving the drive winding at least intermittently such that a drive winding generates an opposing field rectified relative to a rotor magnetic field of the rotor, wherein a holding force of deposited ferromagnetic particles on the rotor is canceled such that the deposited ferromagnetic particles detach from the rotor.

11. The control unit as recited in claim 10, wherein the at least one of the compressor and the turbine is an exhaust-gas turbocharger.

12. An electric media-flow machine mounted to a shaft that is rotationally mounted in a housing having an inlet and an outlet for a medium to be conveyed, a rotor being disposed in rotatably fixed manner on the shaft, the electric media-flow machine including a stator that is fixed in the housing and has at least one polyphase drive winding as well as a plurality of stator teeth projecting radially to an inside, the electric media-flow machine including a covering cap that covers the rotor upstream and to which an inner sleeve is joined surrounding the rotor circumferentially, and the electric media-flow machine including an outer sleeve that is disposed coaxially relative to the inner sleeve, the inner sleeve and the outer sleeve being fixed in the housing, the stator teeth extending through the outer sleeve at least up to the inner sleeve, and flow channels being formed between the outer sleeve, the inner sleeve, and the stator teeth as an only flow path for the medium flowing from the inlet to the outlet through the media-flow machine, wherein a control unit is configured to drive the drive winding at least intermittently such that a drive winding generates an opposing field rectified relative to a rotor magnetic field of the rotor, wherein a holding force of deposited ferromagnetic particles on the rotor is configured to be canceled such that the deposited ferromagnetic particles detach from the rotor.

13. At least one of a compressor and a turbine, comprising:

a housing;

at least one of a compressor impeller and a turbine wheel;

a shaft that is rotationally mounted in the housing and on which the at least one of the compressor impeller and the turbine wheel is disposed in rotatably fixed manner; and a media-flow machine including a rotor disposed in rotatably fixed manner on the shaft, the media-flow machine including a stator that is fixed in the housing and has at least one polyphase drive winding as well as a plurality of stator teeth projecting radially to an inside, the media-flow machine including a covering cap that covers the rotor upstream and to which an inner sleeve is joined surrounding the rotor circumferentially, and the media-flow machine including an outer sleeve that is disposed coaxially relative to the inner sleeve, the inner sleeve and the outer sleeve being fixed in the housing, the stator teeth extending through the outer sleeve at least up to the inner sleeve, and flow channels being formed between the outer sleeve, the inner sleeve, and the stator teeth as an only flow path for a medium flowing from an inlet to an outlet through the media-flow machine, wherein the drive winding is configured to be driven by a control unit at least intermittently such that a drive winding generates an opposing field rectified relative to a rotor magnetic field of the rotor, wherein a holding force of deposited ferromagnetic particles on the rotor is configured to be canceled such that the deposited ferromagnetic particles detach from the rotor.

14. The at least one of the compressor and the turbine as recited in claim 13, wherein the at least one of the compressor and the turbine is an exhaust-gas turbocharger for an internal combustion engine of a motor vehicle.

\* \* \* \* \*